United States Patent Office 3,400,400
Patented Sept. 3, 1968

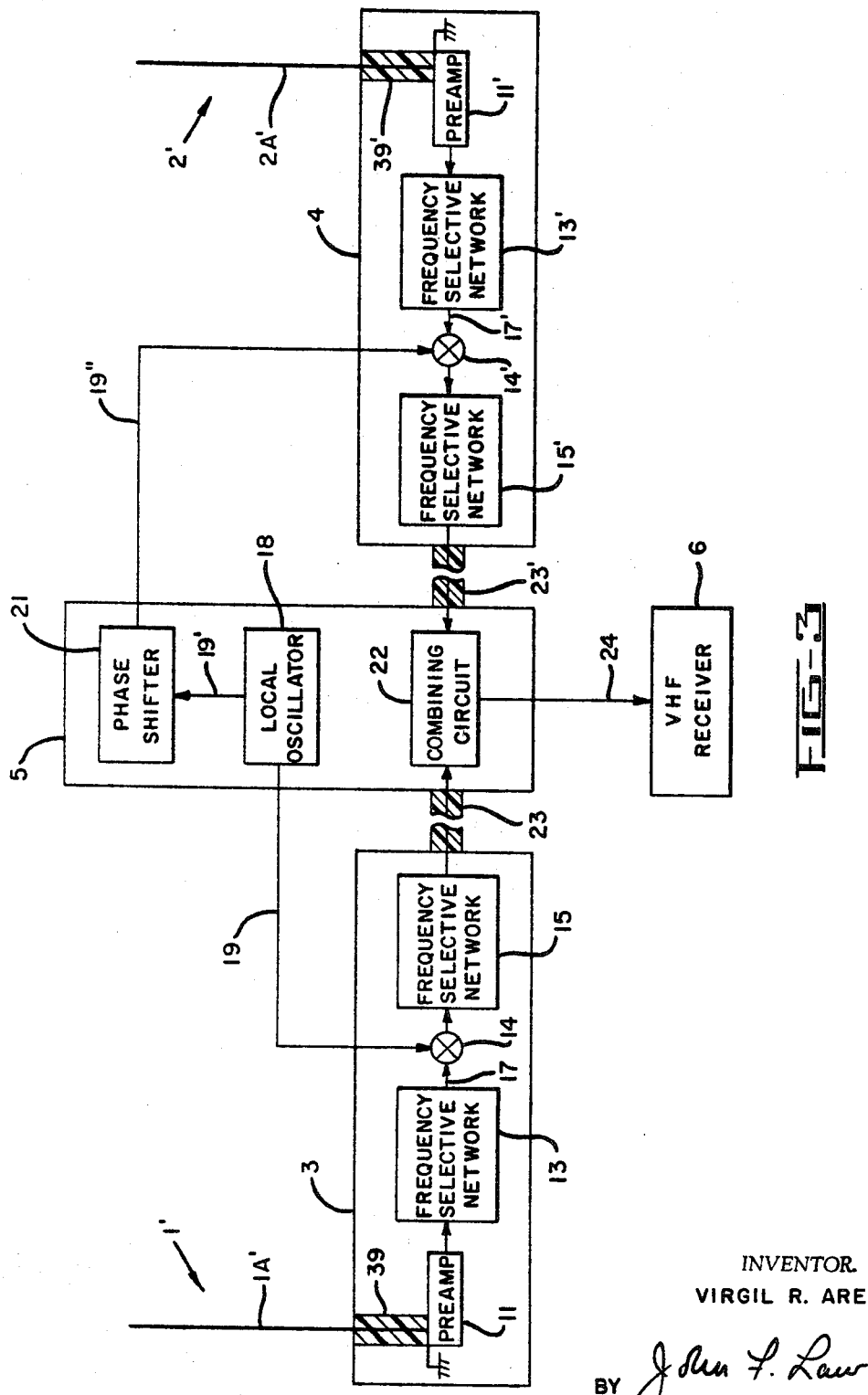

3,400,400
DIRECTION FINDER
Virgil R. Arens, Sunnyvale, Calif., assignor to Sylvania Electric Products Inc., a corporation of Delaware
Filed Feb. 2, 1967, Ser. No. 613,650
9 Claims. (Cl. 343—113)

ABSTRACT OF THE DISCLOSURE

The frequencies of signals received by the antennas of an Adcock direction finder are converted at the antennas to different frequencies. Signals having the different frequencies and signals picked up by cables interconnecting the antennas are coupled to a combining circuit where they are combined in phase opposition. The receiver utilizing the directional information in the output of the combining circuit is responsive only to combining circuit outputs having frequencies equal to the different frequencies.

Background of invention

This invention relates to direction finding and more particularly to an improved Adcock direction finder having low bearing error caused by polarization effects in the atmosphere, and more specifically to an improved Adcock direction finder having reduced sensitivity to horizontally polarized signal components produced by reflection of electromagnetic waves by the ionosphere.

Direction finding at low frequencies and over short distances is accomplished with a loop antenna utilizing the ground wave. Some signals, however, are transmitted from the signal source to the direction finder by sky waves reflected to earth by the ionosphere. When the loop is perpendicular to the direction of travel of an incident radio frequency electromagnetic wave, voltages induced in the vertical sides of the loop are of equal magnitude and the same phase. These voltages cancel to provide zero loop current since the voltages are directed around the loop in opposite directions. When the loop is parallel to the direction of travel of the incident signal, however, the wave reaches the vertical sides of the loop at slightly different times. This causes a difference in the phase of voltages induced in the vertical elements which gives rise to a resultant voltage acting around the loop. The plane of the loop is rotated around its vertical axis to maximize or minimize the output of the loop and determine the direction of arrival of the incident signal and bearing of the transmitter.

A vertically oriented loop antenna gives correct bearing information only when no horizontally polarized waves are present. This is because horizontally polarized waves induce voltages in horizontal members of the loop which do not cancel even when the loop is perpendicular to the bearing angle of the incident signal. The sky wave contains signals which are horizontally polarized by the ionosphere. The strength of the sky wave, and thus of the horizontally polarized signals, is greater at night than during the day. The bearing errors caused by polarization effects in the atmosphere are therefore called night effects.

Direction finding over long distances is accomplished with high frequency (HF) signals utilizing the sky wave. The Adcock antenna is used in these applications because of its reduced sensitivity to horizontally polarized signals. This signal discrimination is achieved by removing one of the horizontal members of the loop antenna. In its simplest form, the Adcock antenna consists of a pair of vertical antennas which are spaced apart and differentially connected. This antenna does not eliminate night effects, however, since horizontal cables interconnecting the vertical antennas operate as horizontally polarized antennas and couple to horizontally polarized signals. Although shielding and balancing out of horizontal cables is employed in fixed or stationary Adcock direction finders, bearing errors have been observed even when the shielded coaxial interconnecting cables are placed below a ground screen. In portable Adcock direction finding systems, shielding or balancing out of horizontal interconnecting elements is not always practicable.

An object of this invention is the provision of an improved direction finder having reduced bearing errors caused by polarization effects.

Summary of invention

In one embodiment of this invention, vertically polarized dipoles of an H-Adcock direction finder are spaced apart in the same plane. Received signals are filtered by a pair of first filters, one of which is located at each dipole. The passband of the first filters determines the operating frequency band of the system. Signals passed by the first filters are converted at the dipoles to a frequency band different from the passband of the first filters by mixing with local oscillator signals each having the same frequency. The mixer outputs are filtered by a pair of second filters, one of which is also located at each dipole, for passing only signals having frequencies in the different frequency band. Signals passed by the second filters and horizontally polarized signals picked up by cables connecting the dipoles are differentially combined by a combining circuit. In order to reduce bearing error in the system, the receiver utilizing the directional information in the output of the combining circuit is responsive only to combining circuit output having frequency in the different frequency band.

Description of drawings

This invention will be more fully understood from the following detailed description of preferred embodiments thereof, together with the accompanying drawings in which:

FIGURE 3 is a schematic block diagram of a U-Adcock direction finder embodying this invention.

Description of preferred embodiments

Figure 1:
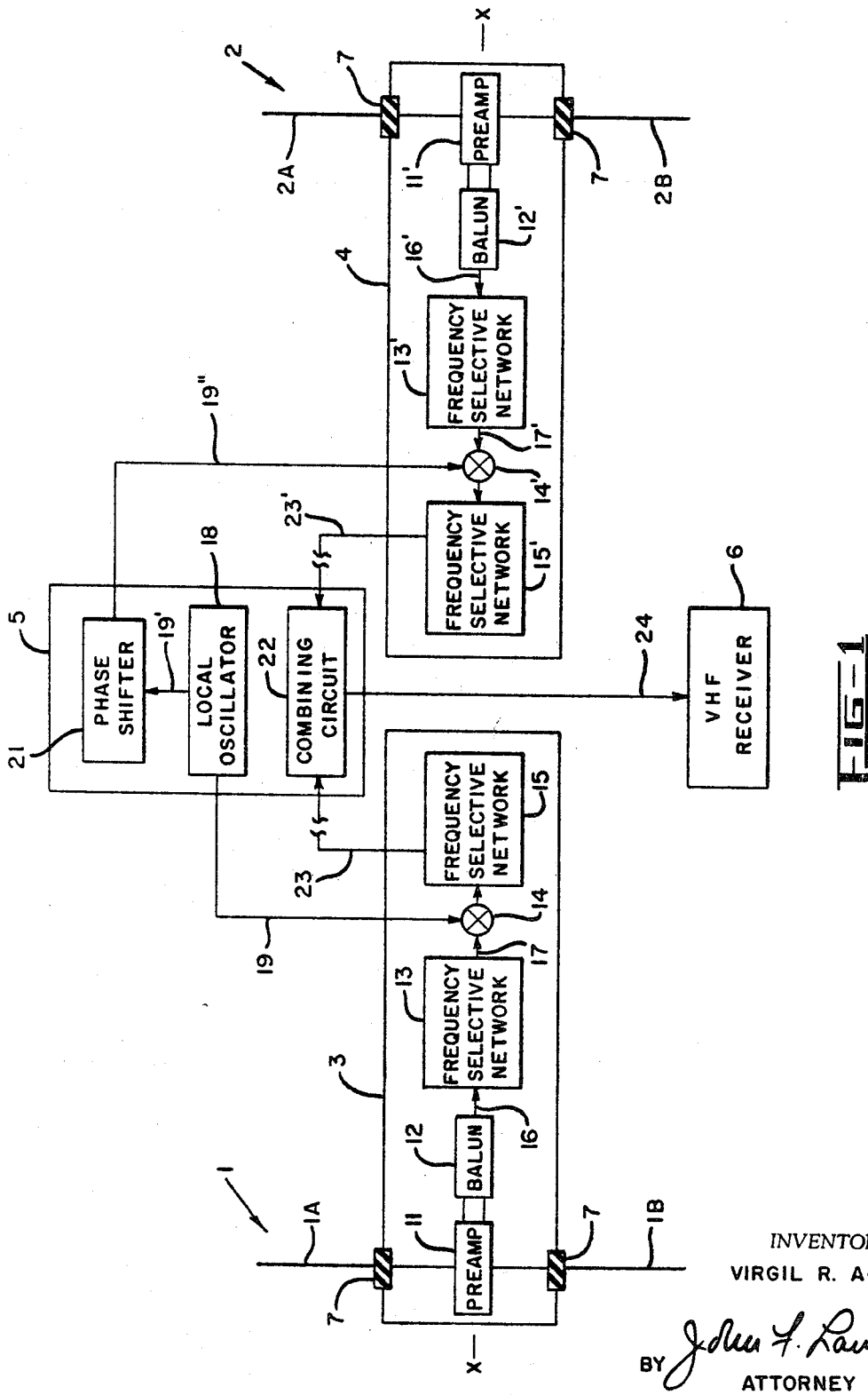
FIGURE 1 is a schematic block diagram of an H-Adcock direction finder embodying this invention.

Referring now to FIGURE 1, a high frequency H-Adcock direction finder embodying this invention comprises a pair of dipole antennas 1 and 2, shielded enclosures 3, 4, and 5 and VHF receiver 6. Dipoles 1 and 2 are parallel to each other and are spaced apart in the same plane. Each dipole comprises a pair of conductive rods A and B which are electrically insulated from enclosures 3 and 4 by insulators 7. The dipoles are oriented for receiving vertically polarized electromagnetic waves and are symmetrical about the longitudinal axis X—X.

Figure 2:
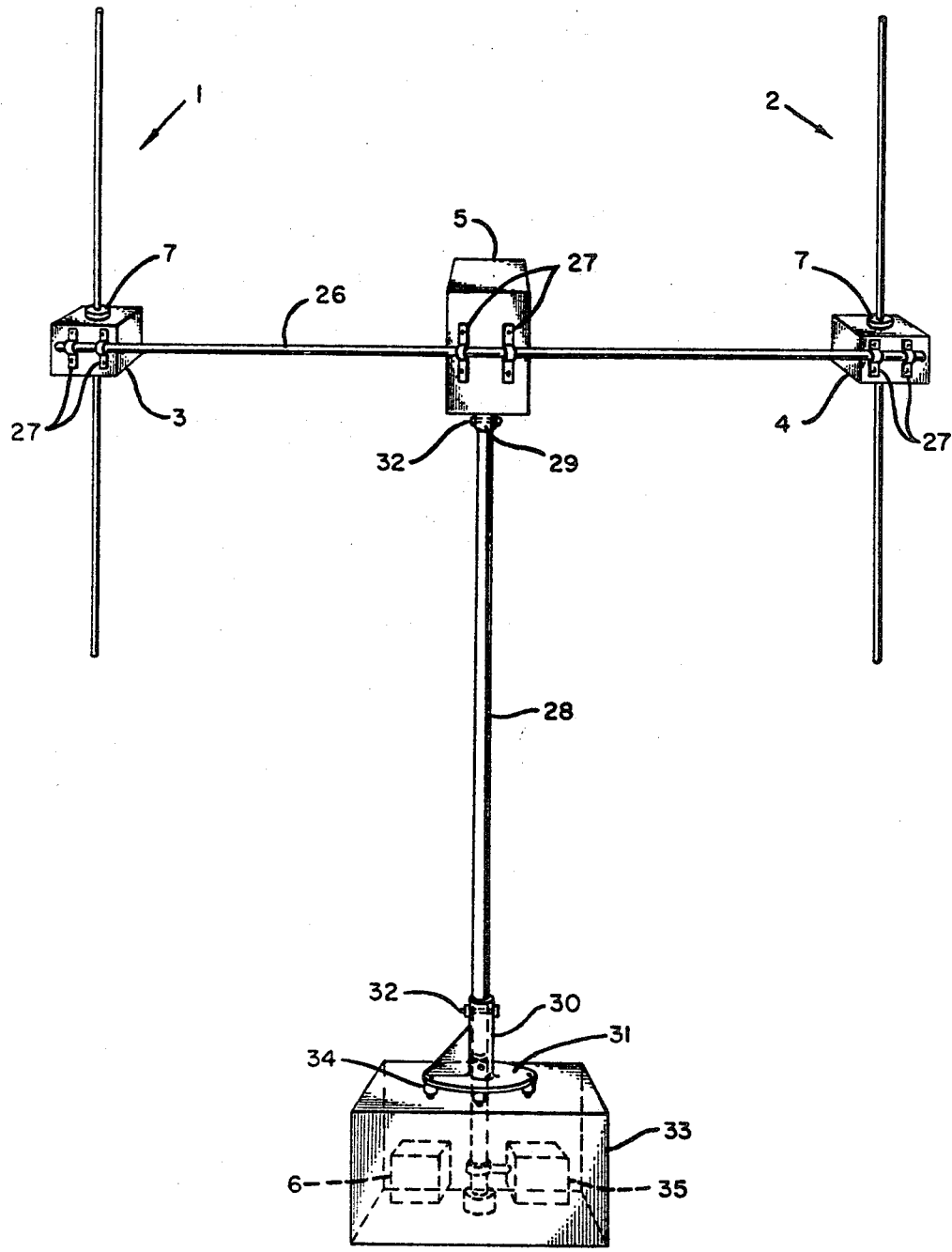
FIGURE 2 is a perspective view of the H-Adcock direction finder of FIGURE 1.

Enclosures 3 and 4 are located immediately adjacent the associated dipoles 1 and 2 and are spaced from enclosure 5, see FIGURE 2. Circuitry in enclosures 3 and 4 is the same. Only circuitry in enclosure 3 therefore will be described. Circuitry in enclosure 4 is designated by primed reference characters.

Enclosure 3 comprises preamplifier 11, balun 12, frequency selective network 13, mixer 14, and frequency selective network 15. In an embodiment of this invention which was built and tested, preamplifier 11 comprised a pair of field effect transistor amplifiers each responsive to the output of one of the dipole elements 1A and 1B and connected in a source follower configuration having unity gain. The outputs of the individual amplifiers are connected through balun 12 in a difference mode for converting the balanced output of dipole 1 to an unbalanced output on coaxial transmission line 16.

Frequency selective network 13 is responsive to the output of the balun for passing HF signals having frequencies in the portion of the HF band over which the direction finder is to operate. Network 13 may, by way of example, be a passband filter. Alternatively, for a system capable of operating in different frequency bands, network 13 may comprise a switch and a bank of filters each operating over a different band of frequencies. The switch is responsive to an output of receiver 6 for connecting the signal on line 16 to one of the filters.

Mixer 14 has a first input responsive to the output of network 13 on line 17 and a second input responsive to the output of local oscillator 18 on line 19. Oscillator 18 is located in enclosure 5. The frequency of oscillation of the local oscillator is adjusted so that the frequencies of signals passed by filter 13 are converted to be frequencies outside the passband of filter 13 in the mixer output. By way of example, the local oscillator frequency may be such that HF signals passed by filter 13 are upconverted to be VHF signals in the mixer output. Alternatively, the local oscillator frequency may be such that HF signals passed by filter 13 are down-converted to be low frequency (LF) signals in the mixer output.

A differential phase shifter 21 is also located in enclosure 5 and is connected in line 19' between the local oscillator and the mixer 14'. The phase shifter provides a mechanism for adjusting the phase of the local oscillator signal applied to mixer 14' and thus for balancing the system.

Frequency selective network 15 is similar to network 13 and may also comprise a passband filter. The passband of filter 15 may correspond to either the upconverted or the down-converted frequencies in the mixer output. By way of example, the passband of filter 15 may be equal to the passband filter 13 plus or minus the local oscillator frequency. Network 15 may also comprise a switch and a bank of filters each having a passband which is upconverted or downconverted from the passband of an associated filter of network 13. The operation of the switches is synchronized by the output of receiver 6.

Combining circuit 22 is located in enclosure 5 and is responsive to signals on lines 23 and 23' for combining the outputs of enclosures 3 and 4 in phase opposition. The combining circuit may, by way of example, comprise a 180° hybrid.

The output of the combining circuit on line 24 contains information regarding the direction of arrival of the received signal. This output on line 24 is similar to that of a conventional Adcock direction finder except that the frequency thereof is different from the frequency of signals passed by filter 13. The output of the combining circuit is processed by receiver 6.

In the portable direction finding system illustrated in FIGURE 2, enclosures 3 and 4 are rigidly secured to opposite ends of tubular aluminum boom 26 by clamps 27. The elements of dipoles 1 and 2 are supported by and insulated from the associated enclosures 3 and 4 by insulators 7. Enclosure 5 is preferably located midway between the dipole antennas and secured to boom 26 by clamps 27. The cables connecting circuits in enclosures 3, 4, and 5 may be located inside boom 26.

Boom 26 and associated circuitry are supported above the ground by a tubular epoxy mast 28. One end of mast 28 is located in a flange 29 which is rigidly secured to the base of enclosure 5. The other end of the mast 28 is located in flange 30 of plate 31. Mast 28 is prevented from rotating in flanges 29 and 30 by bolts 32. Plate 31 is rotatably supported on base pedestal 33 by bearings 34. Rotation of the antenna is effected by manually rotating mast 28 or by operation of motor 35 which is operably connected to the mast. The VHF receiver 6 may also be located in pedestal 50.

A transmitted HF signal may be repolarized by reflection from the ionosphere to be comprised of both vertically and horizontally polarized component signals. The vertically polarized HF component signals are received by dipoles 1 and 2. The horizontally polarized HF component signals are received by the horizontal cables 23 and 23' which operate as horizontally polarized receiving antennas.

In operation, vertically polarized HF signals received by the dipoles are amplified and filtered. If the frequency of the received HF signal is within the passband of filter 13, the signals are upconverted to VHF signals by mixing with the local oscillator signal in mixer 14. The upconverted (VHF) signals in the mixer output are passed on line 23 by filters 15 to the combining circuit. The horizontally polarized HF signals induce HF signals on lines 23 and 23' which are also applied to combining circuit 22. Both the HF and VHF signals on lines 23 and 23' are differentially combined by circuit 22. Receiver 6 is responsive only to the VHF signals on line 24, however, which contain correct bearing information related to the angle of arrival of the incident signal. In this manner, the system is rendered unresponsive to horizontally polarized signals which are in the passband of the system and are a source of bearing error in Adcock direction finders.

The U-Adcock direction finder illustrated in FIGURE 3 is a monopole version of the H-Adcock direction finder of FIGURE 1. Similar components in FIGURES 1 and 3 are identified by the same reference character. The conductive rods 1A' and 2A' of monopole antennas 1' and 2' of FIGURE 3 are fed by coaxial transmission lines 39 and 39', respectively. The inner conductor of lines 39 and 39' is electrically connected to the associated rods 1A' and 2A'. The outer conductors of the coaxial lines are electrically connected to enclosures 3 and 4 and a ground plane.

Although this invention is described in relation to a preferred embodiment thereof, modifications thereof will be apparent to those skilled in the art. The scope of this invention is therefore to be determined from the appended claims rather than from the above detailed description.

What is claimed is:

1. The method of reducing bearing error in a direction finder including a pair of antennas that are spaced apart, a circuit for combining the antenna outputs in phase opposition, and a device utilizing signals containing directional information in the output of said combining circuit, comprising the steps of converting at each antenna the frequency of a signal received thereby to a signal having a different frequency, and adjusting said utilization device to be responsive to the signal in the output of said combining circuit having the different frequency and unresponsive to signals in the output of said combining circuit having the frequency of the received signal.

2. A direction finder comprising a pair of antennas, means responsive to the outputs of said antennas for converting at the antennas the frequency of a received signal to a different frequency, first combining means remote from said antennas and said converting means, conducting means extending between and operationally interconnecting said converting means and said first combining means in the environment of said received signals, said first combining means differentially combining the outputs of said converting means, and utilization means responsive to the output of said combining means which has a frequency equal to the different frequency and unresponsive to signals having a frequency equal to the frequency of the received signal.

3. The direction finder according to claim 2 wherein said connecting means comprises coaxial cables and said antennas are spaced apart and oriented to receive signals having the same polarization.

4. The direction finder according to claim 3 wherein said converting means comprises
- a local oscillator producing a local oscillator signal, and
- second and third means each located at a different antenna for combining the local oscillator signal and the output of a different one of said antennas for producing an output having a frequency different from the frequency of the received signal.

5. A direction finder comprising
- a pair of antennas that are spaced apart and oriented to receive signals having the same polarization,
- means responsive to the outputs of said antennas for converting the frequency of a received signal to a different frequency, said converting means comprising
- a local oscillator producing a local oscillator signal, and
- second and third means each located adjacent a different one of said antennas for combining the local oscillator signal and the output of the associated antenna for producing an output having a frequency different from the frequency of the received signal,
- first means for differentially combining the outputs of said converting means, and
- utilization means responsive to the output of said combining means which has a frequency equal to the different frequency and unresponsive to signals having a frequency equal to the frequency of the received signal.

6. The direction finder according to claim 5 wherein said second and third combining means are mixers.

7. The direction finder according to claim 6 including first and second frequency selective networks each responsive to the output of a different one of said antennas for determining the frequency of received signals applied to said mixers.

8. The direction finder according to claim 5 wherein the system is an H-Adcock direction finder and said antennas are vertically polarized dipole antennas that are parallel to each other.

9. The direction finder according to claim 5 wherein the system is a U-Adcock direction finder and said antennas are vertically polarized monopole antennas that are parallel to each other.

References Cited

UNITED STATES PATENTS 2,282,402   5/1942   Hefele _____ 343—115

OTHER REFERENCES

"Wireless Direction Finding" by R. Keen, received in Scientific Library Oct. 19, 1939, p. 224 relied on (title page included).

RODNEY D. BENNETT, *Primary Examiner.*

RICHARD E. BERGER, *Assistant Examiner.*